US 8,533,694 B2

(12) United States Patent
Pistoia et al.

(10) Patent No.: US 8,533,694 B2
(45) Date of Patent: Sep. 10, 2013

(54) IDENTIFICATION OF READ/WRITE CHAINS DURING STATIC ANALYSIS OF COMPUTER SOFTWARE

(75) Inventors: Marco Pistoia, Amawalk, NY (US); Takaaki Tateishi, Yamato (JP); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1503 days.

(21) Appl. No.: 12/129,894

(22) Filed: May 30, 2008

(65) Prior Publication Data

US 2009/0300266 A1 Dec. 3, 2009

(51) Int. Cl.
*G06F 9/45* (2006.01)
*G06F 7/00* (2006.01)
*G06F 17/30* (2006.01)

(52) U.S. Cl.
USPC .......................................... 717/143; 707/713

(58) Field of Classification Search
None
See application file for complete search history.

(56) References Cited

U.S. PATENT DOCUMENTS

| | | | | |
|---|---|---|---|---|
| 7,530,107 | B1* | 5/2009 | Ono et al. | 717/154 |
| 2005/0091424 | A1* | 4/2005 | Snover et al. | 710/33 |
| 2006/0101435 | A1* | 5/2006 | Akilov et al. | 717/141 |
| 2009/0100415 | A1* | 4/2009 | Dor et al. | 717/131 |

OTHER PUBLICATIONS

Oracle, "Update syntax" MYSQL 5.1 Reference Manual chapter 13.2.10. Retrieved from dev.mysql.com on Aug. 21, 2012. pp. 1-23.*
Koved, Larry, Marco Pistoia, and Aaron Kershenbaum. "Access Rights Analysis for Java" Nov. 4-8, 2002, OOPSLA'02, ACM, pp. 1-14.*
Koganeyama, Mika, Naoshi Tabuchi, and Takaaki Tateishi. "Reducing Unnecessary Conservativeness in Access Rights Analysis with String Analysis," Dec. 4, 2007. IEEE 14th Asia-Pacific Software Engineering Conference, APSEC 2007. pp. 438-445.*

* cited by examiner

*Primary Examiner* — Insun Kang
*Assistant Examiner* — Erika Kretzmer
(74) *Attorney, Agent, or Firm* — Sughrue Mion, PLLC

(57) ABSTRACT

A system for identifying read/write chains in computer software, including a static analysis engine identifying within computer software logical container accesses, a string analyzer configured to at least partly resolve any variables identifying the logical container in any of the accesses by determining a set of potential values of any of the variables, and a Logical Container Access Virtualization component (LCAV) configured to identify the type and scope of any permutations of the accesses, where each of the permutations is defined by substituting any of the potential values for any of the access variables, and identify any read/write chains within the computer software by matching any of the access permutations that read from the logical container with any of the access permutations that write to the logical container if there is an intersection between the scopes of the read and write access permutations.

12 Claims, 2 Drawing Sheets

IDENTIFICATION OF READ/WRITE CHAINS DURING STATIC ANALYSIS OF COMPUTER SOFTWARE

FIELD OF THE INVENTION

The present invention relates to static analysis of computer software in general.

BACKGROUND OF THE INVENTION

The term "static analysis" as it relates to computer software typically refers to the partly or wholly automated analysis of source code or other forms of computer instructions, as opposed to "dynamic analysis," which refers to the analysis of a computer program while it is being executed. While existing static analysis tools provide useful information to computer software developers and programmers, they currently do not provide certain kinds of useful information.

One particular shortcoming of current static analysis tools may be understood by way of the following example. In the case of a computer software application that writes and read information to/from a database using SQL queries, database accesses A and B may be said to be "chainable" if A is a write to the database and B is a read from the database, and if A and B intersect in terms of the areas of the database that they access. In other words, there is overlap between the tables A and B access, and in some of the overlapping tables there is overlap between the columns A and B access. This information would be useful to computer software developers and programmers as it would enable them to identify the implicit flow between points within software code where writing to the database occurs and points where data are read from the database, and verify that the lifecycle of the data through the chain is correct. For example, a developer may want to ensure that data is sanitized (i.e., inspected for malicious content, and if such content is found, then it is removed) either before they are written to the database, or after they are read from it. As commonplace as this scenario is, current static analysis tools are incapable of identifying such chains accurately, particularly where an instruction at one location of a computer program causes information to flow into a database through a write operation, and another instruction at one location of the program causes that same piece of information to be read. Rather, in such cases current static analysis tools typically do one of the following:

1. They map every operation that writes to a database to every operation that reads from the database. This often leads to false positives, such as where write and read operations that are mapped to each other do not overlap at one or more tables and columns of the database;
2. They map write and read operations only in cases where there is hard-coded evidence of the connection between them, such as where the database is accessed using constant keys;
3. In the interest of performance, as well as of reducing the number of false positives, the static analyzer simply ignores possible read/write chains.

Being able to accurately identify such read/write chains would represent a significant improvement to the field of static analysis.

SUMMARY OF THE INVENTION

The present invention in embodiments thereof discloses novel systems and methods for identifying read/write chains in computer software during static analysis.

In one aspect of the present invention a system is provided for identifying read/write chains during static analysis of computer software, the system including a static analysis engine configured to perform static analysis on computer software and identify within the computer software any accesses to a logical container, the logical container being an any entity in which data is persistable, and into which data may be written and from which data may be read, a string analyzer configured to at least partly resolve any variables identifying the logical container in any of the accesses by determining a set of potential values of any of the variables, and a Logical Container Access Virtualization component (LCAV) configured to identify the type and scope of any permutations of the accesses, where each of the permutations is defined by substituting any of the potential values for any of the access variables, and identify any read/write chains within the computer software by matching any of the access permutations that read from the logical container with any of the access permutations that write to the logical container if there is an intersection between the scopes of the read and write access permutations.

In another aspect of the present invention the computer software is in the form of either of source code and object code.

In another aspect of the present invention the LCAV is configured to invoke the string analyzer for any of the accesses to at least partly resolve any of the variables to a first degree of resolution, and subsequently invoke the string analyzer for the access to at least partly resolve any of the at least partly resolved variables to a greater degree of resolution than the first degree of resolution.

In another aspect of the present invention the LCAV is configured to invoke the string analyzer a plurality of times for any of the accesses to at least partly resolve any of the variables of the access to increasing degrees of resolution until the LCAV is able to determine the type and scope of the access.

In another aspect of the present invention a method is provided for identifying read/write chains during static analysis of computer software, the method including a) performing static analysis on computer software to identify within the computer software any accesses to a logical container, the logical container being an any entity in which data is persistable, and into which data may be written and from which data may be read, b) at least partly resolving any variables identifying the logical container in any of the accesses by determining a set of potential values of any of the variables, c) identifying the type and scope of any permutations of the accesses, where each of the permutations is defined by substituting any of the potential values for any of the access variables, and d) identifying any read/write chains within the computer software by matching any of the access permutations that read from the logical container with any of the access permutations that write to the logical container if there is an intersection between the scopes of the read and write access permutations.

In another aspect of the present invention the performing step a) includes performing the static analysis on computer software in the form of either of source code and object code.

In another aspect of the present invention the method further includes performing the resolving step b) for any of the accesses to at least partly resolve any of the variables to a first degree of resolution, and subsequently performing the resolving step b) for the access to at least partly resolve any of the at least partly resolved variables to a greater degree of resolution than the first degree of resolution.

In another aspect of the present invention the method further includes performing the resolving step b) a plurality of times for any of the accesses to at least partly resolve any of the variables of the access to increasing degrees of resolution until the type and scope of the access is determinable.

In another aspect of the present invention a computer-implemented program is provided embodied on a computer-readable medium, the computer program including a code segment operative to perform static analysis on computer software to identify within the computer software any accesses to a logical container, the logical container being an any entity in which data is persistable, and into which data may be written and from which data may be read, a code segment operative to at least partly resolve any variables identifying the logical container in any of the accesses by determining a set of potential values of any of the variables, a code segment operative to identify the type and scope of any permutations of the accesses, where each of the permutations is defined by substituting any of the potential values for any of the access variables, and a code segment operative to identify any read/write chains within the computer software by matching any of the access permutations that read from the logical container with any of the access permutations that write to the logical container if there is an intersection between the scopes of the read and write access permutations.

In another aspect of the present invention the code segment operative to perform static analysis is operative to perform the static analysis on computer software that is in the form of either of source code and object code.

In another aspect of the present invention the code segment operative to at least partly resolve is executable for any of the accesses to at least partly resolve any of the variables to a first degree of resolution, and subsequently executable to at least partly resolve any of the at least partly resolved variables to a greater degree of resolution than the first degree of resolution.

In another aspect of the present invention the code segment operative to at least partly resolve is executable a plurality of times for any of the accesses to at least partly resolve any of the variables of the access to increasing degrees of resolution until the type and scope of the access is determinable.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

Figure 1:
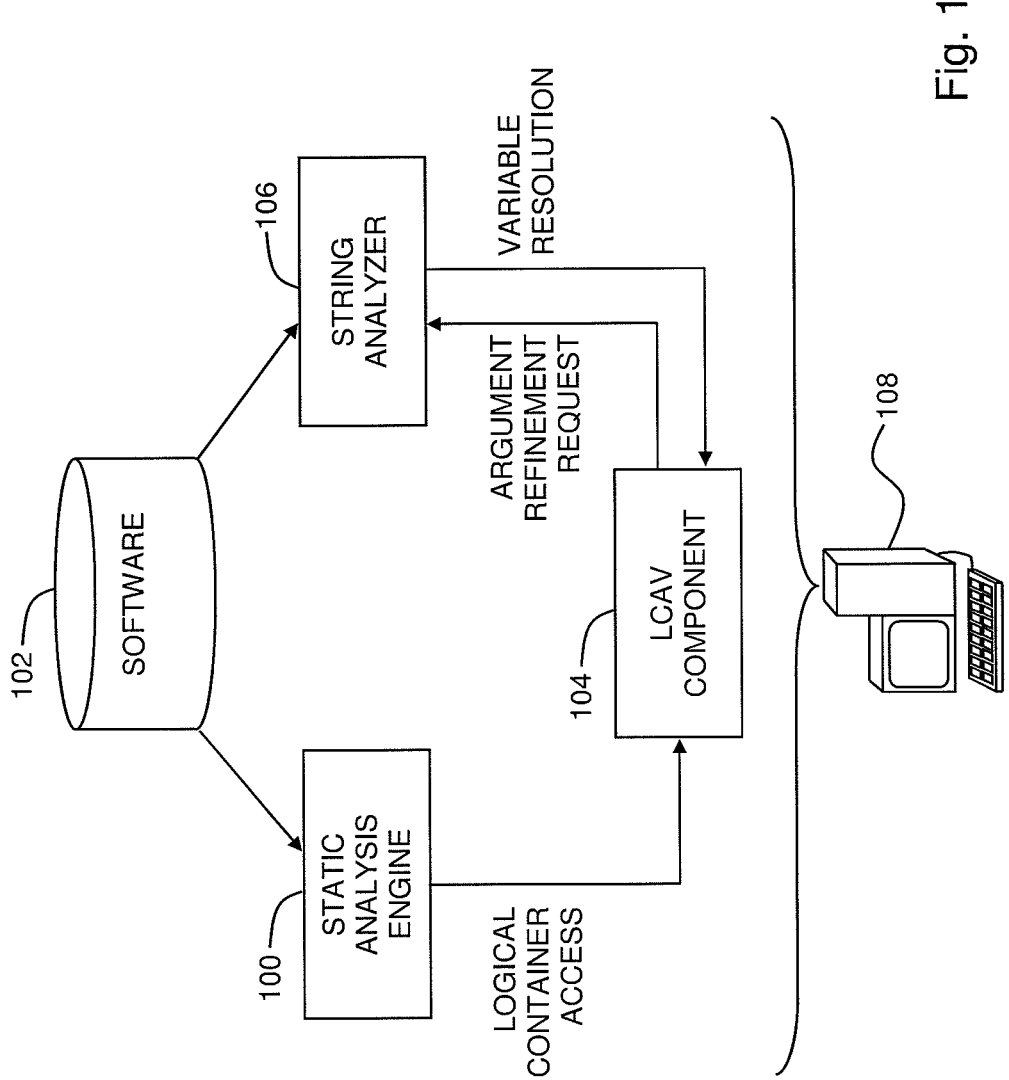
FIG. 1 is a simplified illustration of a system for identifying read/write chains during static analysis of computer software, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or any combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store, the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified illustration of a system for identifying read/write chains during static analysis of computer software, constructed and operative in accordance with an embodiment of the present invention. In the system of FIG. 1, a static analysis engine 100 performs static analysis on computer software 102, such as may be in the form of source code, object code, or any form suitable for static analysis. Whenever static analysis engine 100 encounters a location in software 102 where a logical container is accessed—a "logical container" being defined as any entity in which data may persist, and which exposes interfaces for writing data into it and reading data from it, such as a database or an in-memory data structure—static analysis engine 100 preferably invokes a Logical Container Access Virtualization component (LCAV) 104 and passes to LCAV 104 the encountered location within software 102 and/or the portion of software 102 that defines the logical container access. For example, where the logical container is an SQL database, static analysis engine 100 passes to LCAV 104 the location within software 102 of a call to a language-specific SQL API, and/or the SQL statement itself. LCAV 104 is preferably configured such that it is able to identify the type and scope of each access to a logical container by maintaining an abstract representation of the container, such as by maintaining a representation of tables and columns where the logical container is a database. LCAV 104 is also preferably configured such that it is aware of any APIs that are required for accessing the container and is able to parse access requests, such as SQL queries in the current example.

LCAV 104 preferably determines the type of the access (e.g., read or write) and the scope of the access, such as the tables and columns affected by the query in the current example. If the access information passed to LCAV 104 can be sufficiently resolved to determine the type and scope of the access, LCAV 104 stores the location within software 102 and/or the portion of software 102 that defines the logical container access. If the access information passed to LCAV 104 cannot be sufficiently resolved to determine the type and scope of the access, such as where LCAV 104 receives an SQL query that does not indicate the name of the database being accessed, but rather includes a variable that contains the name of the database being accessed, LCAV 104 preferably invokes a string analyzer 106 to refine the access information by partially or wholly resolving some or all of the access variables. In one embodiment string analyzer 106 implements methods described in U.S. patent application Ser. No. 11/960, 153, entitled "Systems, Methods and Computer Program Products for String Analysis with Security Labels for Vulnerability Detection." String analyzer 106 is preferably configured to determine the set of potential values of a given variable appearing in computer software code. String analyzer 106 is also optionally configured to determine potential variable values with varying degrees of resolution, with lesser or greater resolution achieved in accordance with lesser or greater computational effort. If so configured, string analyzer 106 preferably initially determines potential variable values with a low degree of resolution. String analyzer 106 returns the partially or wholly resolved variables to LCAV 104, whereupon LCAV 104 again attempts to resolve the type and scope of the access, generating one or more permutations of the access by substituting any of the potential values for any of the variables in the access. LCAV 104 may again invoke string analyzer 106 to further refine the access to a greater degree of resolution if necessary. The refinement process preferably continues until the access may be sufficiently resolved by LCAV 104 to determine the type and scope of any of the access permutations, whereupon LCAV 104 stores the location within software 102 and/or the portion of software 102 that defines the logical container access.

At any point, such as when static analysis engine 100 has finished scanning all of software 102 and directs LCAV 104 to do so, LCAV 104 identifies read/write chains within software 102 by matching read access permutations and write access permutations that LCAV 104 has resolved and stored. A read access permutation is matched with a write access permutation if there is an intersection between their access scopes.

Any of the elements shown in FIG. 1 are preferably executed by or otherwise made accessible to a computer 108, such as by implementing any of the elements shown in FIG. 1 in computer hardware and/or in computer software embodied in a computer-readable medium in accordance with conventional techniques.

The system of FIG. 1 may also be understood within the context of the following examples.

EXAMPLE 1

While analyzing the source code of an SQL database application, static analysis engine 100 discovers an SQL API executing the following query:

"SELECT"+col_name+"FROM"+table_name+";"

which engine 100 passes to LCAV 104 for resolution and logging. Although LCAV 104 is able to identify the access as a read access, since LCAV 104 cannot determine the scope of the access without further information on col_name and table_name, it invokes string analyzer 106 to refine the access by resolving these two variables. String analyzer 106 resolves col_name into [Name|ID|Surname] and table_name into [Persons|Employees] (i.e., Name, ID and Surname are the values col_name may assume, and Persons and Employees are the potential values table_name may assume). Using this information, LCAV 104 now logs the following six potential permutations of the access:

"SELECT Name FROM Persons;"
"SELECT ID FROM Persons;"
"SELECT Surname FROM Persons;"
"SELECT Name FROM Employees;"
"SELECT ID FROM Employees;"
"SELECT Surname FROM Employees;"

Later in the analysis, static analysis engine 100 discovers an SQL API executing the following query:

"UPDATE Persons SET Name='Joe' WHERE LastName='Smith';"

which engine 100 passes to LCAV 104 for resolution and logging. When asked by engine 100 to identify any read/write chains found among its entries, LCAV 104 identifies the following read/write chain:

---
"UPDATE Persons SET Name ='Joe' WHERE LastName='Smith';"
"SELECT " + col_name + " FROM " + table_name + ";"
--- as both intersect at table_name=Persons and col_name=Name.

EXAMPLE 2

The following example demonstrates the ability of the present invention to identify read/write chains whose access variables are only partially resolved. As in the previous example, while analyzing the source code of an SQL database application, static analysis engine 100 discovers an SQL API executing the following query:

"SELECT"+col_name+"FROM"+table_name+";"

which engine 100 passes to LCAV 104 for resolution and logging. As before, LCAV 104 invokes string analyzer 106 to resolve col_name and table_name. In the current example, string analyzer 106 partially resolves col_name into "columns.1."+col_id1, and does not provide resolution for table_name. LCAV 104 logs the query and its partial resolution.

Later in the analysis, static analysis engine 100 discovers an SQL API executing the following query:

---
"UPDATE " + table name + " SET Name='" + col name + "' WHERE LastName='" + criterion "';"
--- which engine 100 passes to LCAV 104 for resolution and logging. LCAV 104 again invokes string analyzer 106, this time to resolve col_name and criterion. String analyzer 106 partially resolves col_name into "columns.2. "+col_id2, and does not provide resolution for table_name. LCAV 104 logs the query and its partial resolution.

As neither the read access nor the write access were fully resolved in this example, LCAV 104 may ask string analyzer 106 for further refinement of the resolution of col_id1 and/or col_id2. However, this is not necessary, as LCAV 104 is able to establish that the two queries do not intersect, as the information obtained from the partial resolution shows that the two column names have different prefixes ("columns.1." and "columns.2.").

Figure 2:
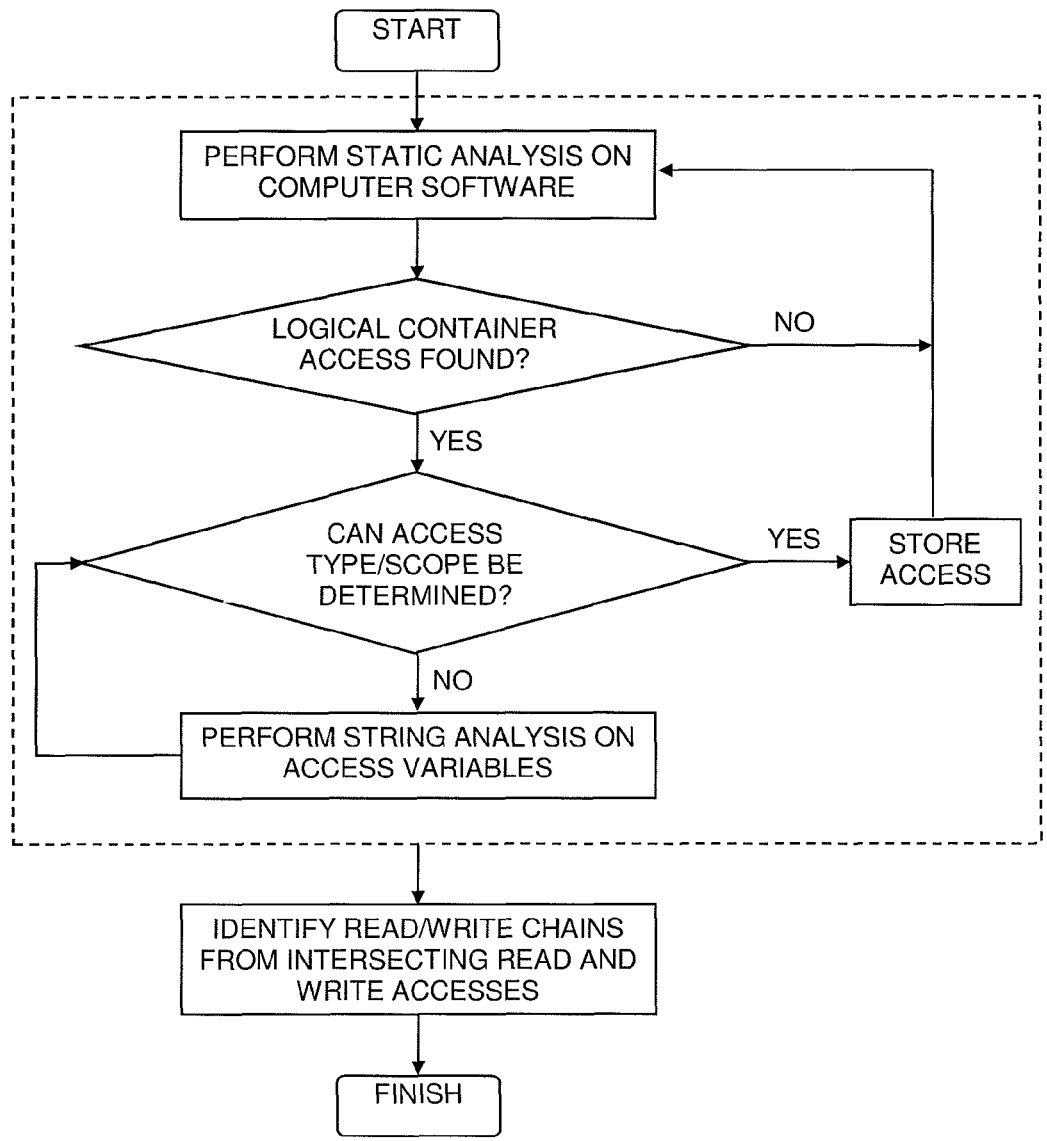
FIG. 2 is a simplified conceptual illustration of an exemplary method of operation of the system of FIG. 1, operative in accordance with an embodiment of the invention.

Reference is now made to FIG. 2 which is a simplified conceptual illustration of an exemplary method of operation of the system of FIG. 1, operative in accordance with an embodiment of the invention. In the method of FIG. 2, static analysis is performed on computer software. During the static analysis, whenever a location in the software is found where a logical container is accessed, a determination is made regarding whether the access is a read or a write access, as well as regarding the scope of the access. If the access can be sufficiently resolved to determine the type and scope of the access, the location within the software and/or the portion of the software that defines the logical container access is stored.

If the access cannot be sufficiently resolved to determine the type and scope of the access, string analysis is performed partially or wholly resolve some or all of the access variables. String analysis may be performed multiple times, each time with increasing resolution of the access variables, until type and scope of the access may be sufficiently determined, whereupon the location within the software and/or the portion of the software that defines the logical container access is stored. Once multiple accesses have been resolved and stored, read/write chains are identified within the software by matching read accesses and write accesses if there is an intersection between their access scopes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A system for identifying read/write chains during static analysis of computer software, the system comprising:
a static analysis engine configured to perform static analysis on computer software and identify within said computer software any accesses to a logical container, said logical container being an entity in which data is persistable, and into which data may be written and from which data may be read;
a processor executing a string analyzer configured to at least partly resolve any variables identifying said logical container in any of said accesses by determining a set of potential values of any of said variables; and
a Logical Container Access Virtualization component (LCAV) configured to identify the type and scope of any permutations of said accesses, wherein each of said permutations is defined by substituting any of said potential values for any of said access variables, and identify any read/write chains within said computer software by matching any of said access permutations that read from said logical container with any of said access permutations that write to said logical container if there is an intersection between the scopes of said read and write access permutations.

2. A system according to claim 1 wherein said computer software is in the form of either of source code and object code.

3. A system according to claim 1 wherein said LCAV is configured to invoke said string analyzer for any of said accesses to at least partly resolve any of said variables to a first degree of resolution, and subsequently invoke said string analyzer for said access to at least partly resolve any of said at least partly resolved variables to a greater degree of resolution than said first degree of resolution.

4. A system according to claim 1 wherein said LCAV is configured to invoke said string analyzer a plurality of times for any of said accesses to at least partly resolve any of said variables of said access to increasing degrees of resolution until said LCAV is able to determine said type and scope of said access.

5. A method for identifying read/write chains during static analysis of computer software, the method comprising:
  a) performing, by a computer program executing on a processor, static analysis on computer software to identify within said computer software any accesses to a logical container, said logical container being an entity in which data is persistable, and into which data may be written and from which data may be read;
  b) at least partly resolving any variables identifying said logical container in any of said accesses by determining a set of potential values of any of said variables;
  c) identifying the type and scope of any permutations of said accesses, wherein each of said permutations is defined by substituting any of said potential values for any of said access variables; and
  d) identifying any read/write chains within said computer software by matching any of said access permutations that read from said logical container with any of said access permutations that write to said logical container if there is an intersection between the scopes of said read and write access permutations.

6. A method according to claim 5 wherein said performing step a) comprises performing said static analysis on computer software in the form of either of source code and object code.

7. A method according to claim 5 and further comprising performing said resolving step b) for any of said accesses to at least partly resolve any of said variables to a first degree of resolution, and subsequently performing said resolving step b) for said access to at least partly resolve any of said at least partly resolved variables to a greater degree of resolution than said first degree of resolution.

8. A method according to claim 5 and further comprising performing said resolving step b) a plurality of times for any of said accesses to at least partly resolve any of said variables of said access to increasing degrees of resolution until said type and scope of said access is determinable.

9. A computer-implemented program embodied on a non-transitory computer-readable medium, the computer program comprising:
  a code segment operative to perform static analysis on computer software to identify within said computer software any accesses to a logical container, said logical container being an entity in which data is persistable, and into which data may be written and from which data may be read;
  a code segment operative to at least partly resolve any variables identifying said logical container in any of said accesses by determining a set of potential values of any of said variables;
  a code segment operative to identify the type and scope of any permutations of said accesses, wherein each of said permutations is defined by substituting any of said potential values for any of said access variables; and
  a code segment operative to identify any read/write chains within said computer software by matching any of said access permutations that read from said logical container with any of said access permutations that write to said logical container if there is an intersection between the scopes of said read and write access permutations.

10. A computer-implemented program according to claim 9 wherein said code segment operative to perform static analysis is operative to perform said static analysis on computer software that is in the form of either of source code and object code.

11. A computer-implemented program according to claim 9 wherein said code segment operative to at least partly resolve is executable for any of said accesses to at least partly resolve any of said variables to a first degree of resolution, and subsequently executable to at least partly resolve any of said at least partly resolved variables to a greater degree of resolution than said first degree of resolution.

12. A computer-implemented program according to claim 9 wherein said code segment operative to at least partly resolve is executable a plurality of times for any of said accesses to at least partly resolve any of said variables of said access to increasing degrees of resolution until said type and scope of said access is determinable.

\* \* \* \* \*